United States Patent
Rasmusen et al.

(10) Patent No.: US 9,551,319 B2
(45) Date of Patent: Jan. 24, 2017

(54) YAWING SYSTEM COMPRISING A PRELOAD MECHANISM

(71) Applicant: Vestas Wind Systems A/S, Aarhus N. (DK)

(72) Inventors: Lars Vermund Rasmusen, Århus (DK); Thomas Frederiksen, Randers Nv (DK)

(73) Assignee: Vestas Wind Systems A/S, Aarhus N. (DK)

( * ) Notice: Subject to any disclaimer, the term of this patent is extended or adjusted under 35 U.S.C. 154(b) by 394 days.

(21) Appl. No.: 14/360,237

(22) PCT Filed: Nov. 21, 2012

(86) PCT No.: PCT/DK2012/050428
§ 371 (c)(1),
(2) Date: May 22, 2014

(87) PCT Pub. No.: WO2013/075721
PCT Pub. Date: May 30, 2013

(65) Prior Publication Data
US 2014/0331797 A1 Nov. 13, 2014

Related U.S. Application Data

(60) Provisional application No. 61/563,560, filed on Nov. 24, 2011.

(30) Foreign Application Priority Data

Nov. 24, 2011 (DK) ................. 2011 70644
Dec. 14, 2011 (DK) ................. 2011 70709

(51) Int. Cl.
*F03D 7/02* (2006.01)
*F16H 19/02* (2006.01)

(52) U.S. Cl.
CPC ............. *F03D 7/0204* (2013.01); *F16H 19/02* (2013.01); *F05B 2260/902* (2013.01);
(Continued)

(58) Field of Classification Search
CPC ...... F03D 7/0204; F03D 7/0244; F16H 19/02; Y10T 74/18056; F05B 2260/902; F05B 2270/604
(Continued)

(56) References Cited

U.S. PATENT DOCUMENTS 4,515,525 A * 5/1985 Doman ................. F03D 7/0204
416/11
5,779,325 A * 7/1998 Diesel ................... B60T 13/683
188/170
(Continued)

FOREIGN PATENT DOCUMENTS

EP    1662138 A1    5/2006
JP    2008232155 A  10/2008
(Continued)

OTHER PUBLICATIONS

International Searching Authority, International Search Report and Written Opinion issued in corresponding PCT Application No. PCT/DK2012/050428 dated May 8, 2013, 12 pages.
(Continued)

*Primary Examiner* — Michael R Reid
(74) *Attorney, Agent, or Firm* — Wood Herron & Evans LLP (57) ABSTRACT

A yawing system (2) for a wind turbine and a method of operating the yawing system (2) are disclosed. The yawing system (2) comprises at least one yaw drive arranged to cause the yawing system (2) to perform yawing movements, a yaw bearing allowing mutual movement between two parts of the yawing system (2) during yawing movements, and a hydraulically driven preload mechanism (1) being adapted to provide an adjustable pre-load force to the yaw bearing. The preload mechanism (1) is automatically operated as a consequence of operating the yawing system (2). Thereby it can be ensured that the preload force is adjusted in accor-
(Continued)

dance with whether yawing movements are being performed, or the position of the nacelle should be maintained. The preload mechanism (1) may be modular, in the sense that two or more preload mechanisms (1) operate independently of each other, thereby providing redundancy.

20 Claims, 6 Drawing Sheets

(52) U.S. Cl.
CPC ....... *F05B 2270/604* (2013.01); *Y02E 10/723* (2013.01); *Y10T 74/18056* (2015.01)

(58) Field of Classification Search
USPC .......................................................... 416/14
See application file for complete search history.

(56) References Cited

U.S. PATENT DOCUMENTS

| 6,254,197 | B1* | 7/2001 | Lading | B60T 13/22 |
|---|---|---|---|---|
| | | | | 303/15 |
| 6,265,785 | B1* | 7/2001 | Cousineau | F03D 7/0248 |
| | | | | 290/42 |
| 9,359,995 | B2* | 6/2016 | Trede | F03D 7/0204 |
| 2008/0164751 | A1* | 7/2008 | Wedekind | F03D 7/0244 |
| | | | | 303/22.1 |
| 2011/0171022 | A1* | 7/2011 | Behnke | F03D 7/0204 |
| | | | | 416/1 |

FOREIGN PATENT DOCUMENTS

| WO | 9722804 | A1 | 6/1997 |
|---|---|---|---|
| WO | 9823474 | A1 | 6/1998 |
| WO | 2008053017 | A2 | 5/2008 |

OTHER PUBLICATIONS

Danish Patent and Trademark Office, Combined search and examination report issued in corresponding DK application No. PA 2011 70644 dated Jul. 6, 2012, 5 pages.

Wikipedia, Yaw System, retrieved from the Internet: URL:http://en.wikipedia.org/wiki/Yaw_system, dated Aug. 23, 2010, 4 pages.

* cited by examiner

YAWING SYSTEM COMPRISING A PRELOAD MECHANISM

FIELD OF THE INVENTION

The present invention relates to a yawing system for a wind turbine. The yawing system of the invention comprises a preload mechanism being adapted to provide an adjustable preload force to a yaw bearing of the yawing system. The invention further relates to a method of operating such a yawing system.

BACKGROUND OF THE INVENTION

Modern horizontal axis wind turbines comprise a tower construction mounted on a ground foundation or on an offshore foundation structure. The tower construction carries a nacelle carrying a hub with a number of wind turbine blades, often three wind turbine blades. The hub is mounted rotatably on the nacelle about a substantially horizontal axis in such a manner that the hub rotates as a consequence of the wind turbine blades catching the wind. The nacelle houses various components used for converting this rotational movement into electrical energy, such as a generator and possibly a gear arrangement.

The nacelle is mounted on the tower construction in a rotatable manner, via a yawing system, in order to allow the wind turbine blades to be directed in accordance with the wind direction. The yawing system typically comprises a large toothed ring and one or more yaw drives, each yaw drive comprising an output gear wheel arranged in engagement with the large toothed ring. The large toothed ring may be arranged on the tower construction, while the yaw drive(s) is/are mounted on the nacelle. As an alternative, the large toothed ring may be arranged on the nacelle, while the yaw drive(s) is/are mounted on the tower construction. In any event, when the output gear wheel of the yaw drive(s) is/are rotated, the nacelle is rotated due to the engagement between the large toothed ring and the output gear wheel(s) of the yaw drive(s), i.e. yawing movements are performed.

When yawing movements are not performed by the yawing system, it is desirable to maintain the yawing system in the selected position. This may, e.g., be obtained by applying a preload to the yawing system, where the preload force must be overcome in order to move the nacelle relative to the tower construction. As an alternative it may, e.g., be obtained by means of a separate yaw braking system. In the case that a preload is applied, the size of the preload force must be selected and balanced in such a manner that, on the one hand, the preload force is sufficiently high to maintain the nacelle in position when it is not desired to perform yawing movements, and, on the other hand, the preload force is sufficiently low to allow yawing movements without having to transfer excessive torque between the output gear wheel(s) of the yaw drive(s) and the large toothed ring.

EP 1 571 334 A1 discloses a wind turbine yawing system and yawing process. The yawing system comprises a gear ring fixed to the tower, at least one geared motor meshed with the gear ring through a gear wheel, at least one active braking module, and at least one passive braking module. Each active braking module comprises at least one braking element shiftable between a first position and a second position, according to braking instructions, such that the active braking module exerts a first braking force when the braking element is in the first position, and a second braking force when the braking element is in the second position, the second braking force being greater than the first braking force. Each passive braking module exerts a constant braking force. Thus, the active braking module(s) allow(s) the total braking force to be adjusted. However, in the case that it is desired to perform yawing movements, it is still necessary to overcome the braking force provided by the passive braking module(s).

EP 1 662 138 A1 discloses a speed reducer for use in a yaw drive apparatus for a wind power generation apparatus. According to one embodiment, the speed reducer comprises a plurality of brake mechanisms attached to a nacelle housing. Each brake mechanism is constituted by a fluid cylinder connected to a switching valve through a supply/discharge passage.

DESCRIPTION OF THE INVENTION

It is an object of embodiments of the invention to provide a yawing system for a wind turbine, the yawing system being capable of holding the yawing system in a selected yawing position, while minimising the required force when yawing movements are to be performed.

It is a further object of embodiments of the invention to provide a yawing system for a wind turbine, the yawing system ensuring that a required holding force is automatically available.

It is an even further object of embodiments of the invention to provide a method of operating a yawing system for a wind turbine, the method ensuring that the yawing system is held in a selected yawing position, while minimising the required force when yawing movements are to be performed.

It is an even further object of embodiments of the invention to provide a method of operating a yawing system for a wind turbine, the method ensuring that a required holding force is automatically available.

According to a first aspect the invention provides a method of operating a yawing system for a wind turbine, the yawing system including a hydraulically driven preload mechanism having a hydraulically operated piston, an accumulator, and a valve switchable between a first position establishing a fluid connection between the hydraulically operated piston and the accumulator and a second position establishing a fluid connection between the hydraulically operated piston and a tank, the method comprising the steps of:

applying a preload force to a yaw bearing of the yawing system when the yawing system is not performing yawing movements, wherein the valve is in the first position so that pressure in the accumulator causes the hydraulically operated piston to apply the preload force, moving the valve to the second position, thereby allowing fluid to flow from the hydraulically operated piston to the tank, via the established fluid connection, to release the preload force provided by the hydraulically operated piston, and operating the yawing system to perform yawing movements, wherein said operation of the yawing system automatically causes a pump to operate to supply fluid to the accumulator.

According to the method of the first aspect of the invention, a preload force is applied to a yaw bearing of the yaw system when the yawing system is not performing yawing movements. This is obtained by arranging the valve in the first position so that pressure in the accumulator causes the hydraulically operated piston to apply the preload force.

Thus, the preload force is automatically applied when the valve is moved to the first position.

Then the valve is moved to the second position, i.e. a fluid connection is established between the hydraulically operated piston and the tank. Thereby fluid is allowed to flow from the hydraulically operated piston to the tank, via the established fluid connection, and the preload force provided by the hydraulically operated piston is thereby released. Thus, the preload force is automatically released when the valve is moved to the second position.

Finally, the yawing system is operated to perform yawing movements. This can be done while the valve is in the second position, and the preload force is therefore released. Accordingly, the force to be overcome in order to operate the yawing system is minimised. Furthermore, the operation of the yawing system automatically causes a pump to operate to supply fluid to the accumulator. Thereby it is ensured that, when the yawing operation is stopped, fluid is available in the accumulator, and can therefore be supplied to the hydraulically operated piston in order to enable the hydraulically operated piston to apply the preload force. Thereby it is ensured that a required holding force is automatically available when yawing operations are note performed.

Thus, the method may further comprise the steps of:
stopping operation of the yawing system, and
moving the valve to the first position, thereby allowing fluid to flow from the accumulator to the hydraulically operated piston, via the established fluid connection, so that pressure in the accumulator causes the hydraulically operated piston to apply a preload force.

The step of operating the yawing system may comprise driving the pump by means of a ring gear of the yawing system.

The step of moving the valve may be controlled by means of a control unit. In this case the control unit may control movements of the valve between the first position and the second position in response to an electronic, mechanical, or hydraulic signal. Thus, the control signals can be electrical, mechanical or pressure controlled. Electronic signals can switch the valve simultaneously with the signal to start yawing operations. Another possibility is to use a mechanical contact that switches the signal. Finally, it is also possible to use the hydraulic pressure generated by the pump to switch the valve position, giving a fully autonomous system.

The step of moving the valve to the second position and the step of operating the yawing system may be initiated simultaneously. According to this embodiment, valve is moved to the second position, thereby releasing the preload force, when yawing movements are initiated. Furthermore, the valve may be moved to the first position, thereby applying the preload force, when yawing movements are stopped.

As an alternative, the step of moving the valve to the second position may be performed immediately prior to the step of operating the yawing system.

According to a second aspect of the invention there is provided a yawing system for a wind turbine, the yawing system comprising:
at least one yaw drive arranged to cause the yawing system to perform yawing movements,
a yaw bearing allowing mutual movement between two parts of the yawing system during yawing movements,
a hydraulically driven preload mechanism (1) having at least one pump (3) configured to be automatically operated as a consequence of operating the yawing system (2), at least one hydraulically operated piston (4) being arranged to provide a preload force to the yaw bearing, at least one accumulator (5), and a valve (6) being switchable between a first position establishing a fluid connection between the hydraulically operated piston (4) and the accumulator (5) and a second position establishing a fluid connection between the hydraulically operated piston (4) and a tank (9), and
a control unit (7) configured to switch the valve (6) from the first position to the second position when the yawing system (2) performs yawing movements.

In the present context the term 'yawing system' should be interpreted to mean a system which allows a nacelle of a wind turbine to rotate relative to a tower construction of the wind turbine, as described above. The wind turbine is preferably a modern wind turbine of the kind which transforms energy contained in the wind into electrical energy. The wind turbine may, e.g., be a horizontal axis wind turbine.

The yawing system comprises at least one yaw drive. Each yaw drive is arranged to cause the yawing system to perform yawing movements. The yaw drive(s) may, e.g., each comprise a motor, a gear arrangement and an output gear wheel arranged in engagement with a large toothed ring. As an alternative, the yaw drive(s) may be direct drive(s), i.e. without gear arrangements, the yaw motor in this case being connected directly to a pinion without a gear ratio. When the motor operates the output gear wheel, via the gear arrangement, relative movements between the yaw drive(s) and the large toothed ring occur. When the large toothed ring is arranged on the tower construction and the yaw drive(s) on the nacelle, or vice versa, this causes the nacelle to rotate relative to the tower construction, i.e. yawing movements are performed.

The yawing system further comprises a yaw bearing. The yawing movement described above takes place via the yaw bearing, which forms an interface between the tower construction and the nacelle. Accordingly, the yaw bearing allows mutual movements between two parts of the yawing system, i.e. a part arranged on the tower construction and a part arranged on the nacelle, during yawing movements.

The yawing system further comprises a preload mechanism being adapted to provide an adjustable preload force to the yaw bearing. Thus, the preload mechanism pushes against the yaw bearing by applying the preload force, and the applied force is adjustable, i.e. it can be changed in accordance with the current situation, such as whether or not yawing movements are being performed. The preload force may further be adjustable in accordance with environmental aspects. For instance, low temperatures may increase the friction between surfaces of the preload mechanism, and it may therefore be desirable to adjust the preload force in response to changes in ambient temperature.

The preload mechanism is automatically operated as a consequence of operating the yawing system. Thereby it is ensured that when the yawing system is operated, i.e. yawing movements are being performed, the preload mechanism is also operated, and thereby it can be ensured that the preload force is adjusted in accordance with whether yawing movements are being performed, or the position of the nacelle should be maintained. This is an advantage, because it is therefore not necessary to balance the preload force between these two situations, and instead it is possible to maximise the preload force when the nacelle must be maintained in a selected position, and to minimise, or even remove, the preload force when yawing movements are performed.

The automatic operation of the preload mechanism may, e.g., be obtained in a mechanical manner. In this case, the yaw drive(s) may be mechanically connected to the preload mechanism in such a manner that movements of the yaw drive(s) causes the required operation of the preload mechanism. As an alternative, an electrical signal may be generated by the yaw drive(s) when the yaw drive(s) is/are operated. The generated signal may be supplied to the preload mechanism in order to cause the required operation of the preload mechanism. The signal may, e.g., be generated when the yawing movements start. Alternatively, the signal may be generated when the yaw motor(s) start(s) operating. In this case the signal is supplied to the preload mechanism before the yawing movements start, since the actual yawing movements will be delayed due to backlash introduced in the yaw gear.

The preload mechanism is hydraulically driven. Thereby the preload force is adjusted by adjusting a pressure prevailing in suitable parts of the preload mechanism. Additional preload force may be provided in other suitable ways, such as mechanically, e.g. by means of a spring.

The preload mechanism further comprises at least one pump, said pump being automatically operated as a consequence of operating the yawing system. Accordingly, the pump of the hydraulically driven preload mechanism is automatically operated as a consequence of operating the yawing system. Thereby at least one pressure of the preload mechanism is changed.

The pump may be driven by a ring gear of the yawing system. According to this embodiment, the pump is directly driven by the yawing movement performed by the yawing system. This is a very failsafe manner of operating the pump, since it is not dependent on electrical or other intermediate signals for activating the pump. However, as an alternative, the pump may be driven by a mechanical, electrical or other suitable kind of signal, said signal being generated in response to yawing movements being performed by the yawing system.

The preload mechanism further comprises at least one hydraulically operated piston being arranged to provide the preload force, and at least one accumulator. The at least one piston provides the preload force, and the preload force can be adjusted by adjusting the position of the piston. The accumulator is used for storing energy in the preload system in the form of a pressure built up in the accumulator. The energy stored in this manner may be used at a later point in time by allowing the pressure in the accumulator to be reduced, while increasing the pressure in other parts of the hydraulic system.

The accumulator may, e.g., be a bladder accumulator, a piston accumulator or a diaphragm accumulator. Bladder accumulators feature fast response, and are typically able to handle a maximum gas compression ratio of approximately 4:1 and a maximum flow rate of approximately 15 liters per second. Furthermore, bladder accumulators have good dirt tolerances and are mostly unaffected by particle contamination in the hydraulic fluid.

Piston accumulators are able to handle higher gas compression ratios than bladder accumulators. Typically, piston accumulators handle a gas compression ratio of up to approximately 10:1, and a flow rate of up to approximately 215 liters per second. Furthermore, it is possible to mount piston accumulators in any desired position and orientation.

Diaphragm accumulators exhibit most of the advantages of the bladder accumulators described above. In addition, diaphragm accumulators are typically able to handle gas compression ratios up to approximately 8:1.

The preload mechanism further comprises a valve being switchable between a first position establishing a fluid connection between the hydraulically operated piston and the accumulator, and a second position establishing a fluid connection between the hydraulically operated piston and a tank. When the valve is in the first position, a pressure which has previously been built up in the accumulator can be released to the piston, i.e. hydraulic fluid flows from the accumulator to the piston, thereby increasing the pressure at the piston and moving the piston in one direction. When the valve is in the second position, the pressure built up at the piston in this manner is released to the tank, i.e. hydraulic fluid is moved from the piston to the tank, thereby reducing the pressure at the piston and moving the piston in a second, reverse, direction.

The preload mechanism further comprises a control unit configured to control operation of the valve, i.e. configured to switch the valve from the first position to the second position when the yawing system performs yawing movements. The control unit may control operation of the valve by means of hydraulics, by means of a mechanical signal, by means of an electrical signal, or by means of any other suitable kind of signal.

The control unit may further be arranged to control operation of the pump. In this case the control signals generated by the control unit for the valve and for the pump, respectively, may be coordinated. For instance, the signals may be generated and supplied substantially simultaneously. Alternatively, a predefined time interval may be allowed to lapse from one signal is generated and supplied until the other signal is generated and supplied. Thereby it can, e.g., be ensured that the valve is moved to a desired position before the pump is started.

The preload force provided by the hydraulically operated piston may increase when the valve is in the first position, and decrease when the valve is in the second position. According to this embodiment, the preload force increases when the piston is moved in the first direction, and decreases when the piston is moved in the second direction.

According to one embodiment, a pressure may be automatically built up in the accumulator as a consequence of operating the yawing system. This ensures that hydraulic fluid will be available in the accumulator for being supplied to the piston when the yawing movement stops.

A yawing system according to this embodiment of the invention may operate in the following manner. During normal operation of the wind turbine, i.e. when the nacelle is being maintained in a selected position, the valve is in the first position, thereby establishing a fluid connection between the piston and the accumulator. As a consequence, the pressure at the piston is maximal, the piston is moved as far as possible in the first direction, and the preload force is thereby also maximal. Accordingly, the nacelle is maintained firmly in the selected position. When operation of the yawing system is initiated, the valve is moved to the second position, thereby establishing a fluid connection between the piston and the tank. As a consequence, hydraulic fluid flows from the piston to the tank, thereby decreasing the pressure at the piston, moving the piston as far as possibly in the second direction, and thereby minimising the preload force. This allows the nacelle to be moved easily. Simultaneously, the pump is operated, thereby ensuring that a pressure is built up in the accumulator. Thus, when the yawing movement is stopped and the valve is moved back to the first position, it is ensured that hydraulic fluid is available for being supplied to the piston. Accordingly, it is ensured that a sufficient preload force can be provided to maintain the nacelle firmly in the selected position. As described above, operation of the pump and the valve may be coordinated, e.g. by generating and supplying control signals in a coordinated manner.

The yaw bearing may be a friction bearing. Alternatively, the yaw bearing may be a ball bearing, a roller bearing, or any other suitable kind of bearing.

In the case that the yaw bearing is a friction bearing, the preload mechanism may form part of the friction bearing. According to this embodiment, some parts of the preload mechanism constitute structural parts of the friction bearing.

The preload mechanism may be arranged to provide friction between two surfaces. This may, e.g., be obtained by means of a piston as described above. As an alternative, it may be obtained by means of an arrangement including a bellow which can be expanded or compressed by supplying or removing hydraulic fluid from the bellow, thereby moving an end surface of the bellow away from or towards another surface.

The yawing system may comprise at least two preload mechanisms, each preload mechanism being adapted to provide an adjustable preload force to the yaw bearing, and each preload mechanism being automatically operated as a consequence of operating the yawing system. According to this embodiment, the yawing system comprises at least two preload mechanisms of the kind which has been described above. The preload mechanisms may be operated independently of each other. This should be interpreted to mean that the control of one preload mechanism has no influence on the control of another preload mechanism. Thus, if a failure occurs in one preload mechanism, the other preload mechanism(s) will not be affected, but will continue operation. This provides a failsafe, modular preload system. For instance, the preload mechanisms may comprise separate hydraulic systems and/or separate electrical control systems. Each preload mechanism or module may comprise two or more pistons, each providing a preload force as described above. Furthermore, two or more of the preload mechanisms may be grouped to form a module, the yawing system comprising two or more of such modules being operated independently of each other.

The valve may be biased toward the first position. According to this embodiment, the valve will be in the first position, and a preload will thereby be applied by the hydraulically operated piston, unless the valve is actively moved to the second position. Thereby it is ensured that a sufficient preload force is present, and that the preload force is only released when yawing operation is required.

BRIEF DESCRIPTION OF THE DRAWINGS

The invention will now be described in further detail with reference to the accompanying drawings in which.

DETAILED DESCRIPTION OF THE DRAWINGS

Figure 1:
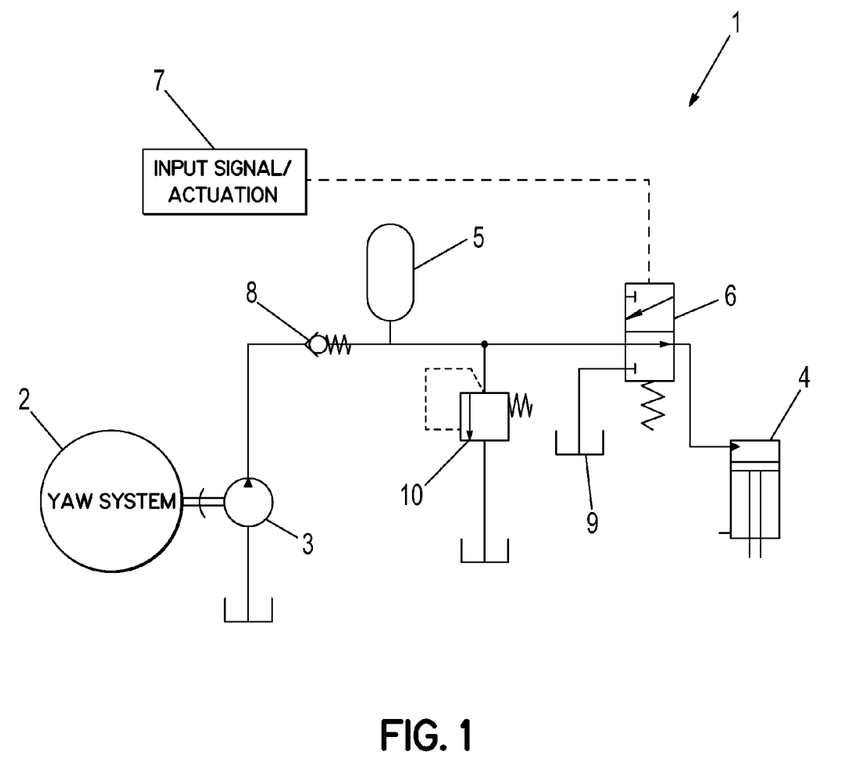
FIG. 1 is a schematic view of a preload mechanism for a yawing system according to a first embodiment of the invention, when the yawing system is not operated.
Figure 2:
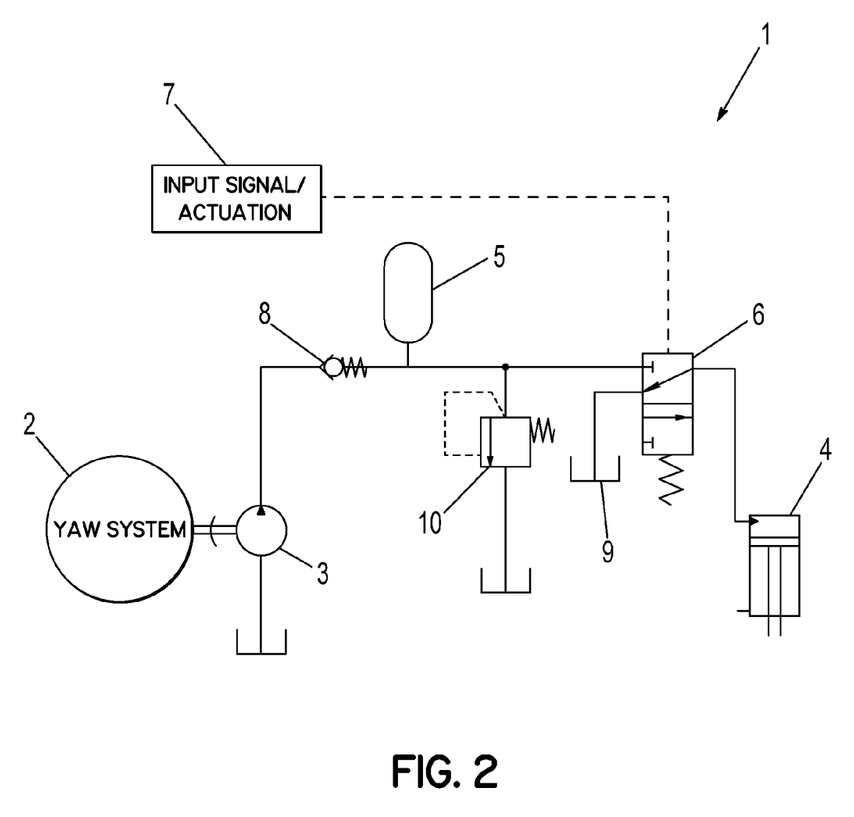
FIG. 2 is a schematic view of the preload mechanism of FIG. 1, during operation of the yawing system.

FIGS. 1 and 2 are schematic views of a preload mechanism 1 for a yawing system 2 according to a first embodiment of the invention. The preload mechanism 1 is hydraulically driven and comprises a pump 3, a piston 4 and an accumulator 5.

A valve 6 is switchable between two positions in response to control signals generated by a control unit 7. In FIG. 1 the valve 6 is in a first position, establishing a fluid connection between the piston 4 and the accumulator 5. Thereby hydraulic fluid which has previously been supplied to the accumulator 5 can be supplied to the piston 4. Thereby the pressure inside the piston cylinder is increased, and the piston 4 is pushed forward, i.e. in a downwards direction in the Figure. Thereby an opposite end of the piston 4 is pushed against a surface (not shown) of the yaw bearing (not shown), thereby maximising the preload force provided by the piston 4. During this, check valve 8 ensures that hydraulic fluid does not flow towards the pump 3 and the yawing system 2.

When it is desired to perform yawing movements, the yawing system 2 is operated, and simultaneously the control unit 7 generates a control signal for the valve 6, causing the valve 6 to move to the second position, illustrated in FIG. 2. In the second position, the valve 6 establishes a fluid connection between the piston 4 and a tank 9. Thereby hydraulic fluid flows from the piston 4 to the tank 9. Accordingly, the pressure inside the piston cylinder is decreased, and the piston 4 is moved backwards, i.e. in an upwards direction in the Figure. Thereby the opposite end of the piston (not shown) is moved away from the surface (not shown) of the yaw bearing (not shown), thereby minimising the preload force provided by the piston 4. Thereby the yawing movements can be performed with no, or only little, resistance.

Simultaneously, or after a predefined time has elapsed after moving the valve 6 to the second position, the yawing system 2 operates the pump 3, thereby supplying hydraulic fluid to the accumulator 5, via the check valve 8. Thereby it is ensured that a pressure is built up in the accumulator 5, and that hydraulic fluid is available for being supplied from the accumulator 5 to the piston 4, as described above with reference to FIG. 1, when the yawing movements are stopped. Security valve 10 prevents an excessive pressure from being built up in the accumulator 5, in the case that the yawing system 2 is operated for a longer time period than what is required in order to obtain a suitable pressure level in the accumulator 5.

Furthermore, the security valve 10 may be adjustable. In this case the security valve 10 may be adjusted to control the extent to which the accumulator is pressurized, thereby affecting the preload force eventually applied by the piston 4. For instance, the security valve 10 may be adjusted in accordance with environmental aspects. For instance, friction between two surfaces may increase at low temperatures, and a lower preload force may therefore be required at low temperatures than at higher temperatures.

It should be noted that the pump 3 may, alternatively, be operated by means of an electrical signal generated by the control unit 7. In this case, the signals generated for the valve 6 and for the pump 3 may be coordinated in order to coordinate the operation of the valve 6 and the pump 3. For instance, operation of the valve 6 and the pump 3 may be initiated substantially simultaneously, or with a predefined time interval there between.

The valve 6 is biased towards the first position, illustrated in FIG. 1. Thereby it is ensured that a maximum preload force is provided in the case of power failure or failure of the control unit 7. Thereby it is ensured that yawing movements can not occur unless the yawing system 2 is actively operated.

In the embodiment illustrated in FIGS. 1 and 2, the piston 4 is allowed to move backwards until there is no contact between the piston 4 and the surface of the yaw bearing, when the valve 6 is in the second position illustrated in FIG. 2, thereby removing the preload completely. However, in a modified embodiment, a second security valve, similar to security valve 10, can be arranged between the valve 6 and the tank 9. Thereby the movement of the piston 4 is limited, when the valve 6 is in the second position illustrated in FIG. 2, and a preload force is maintained, which is reduced as compared to the situation illustrated in FIG. 1.

Figure 3:
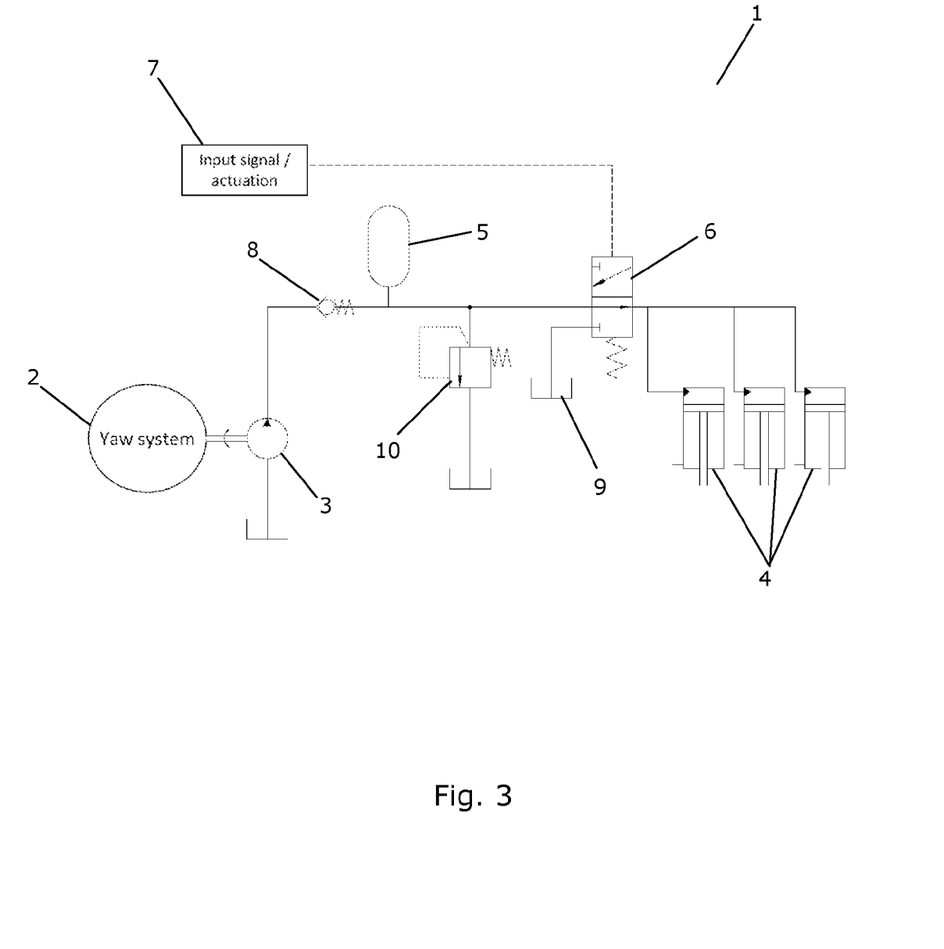
FIG. 3 is a schematic view of a preload mechanism for a yawing system according to a second embodiment of the invention, when the yawing system is not operated.
Figure 4:
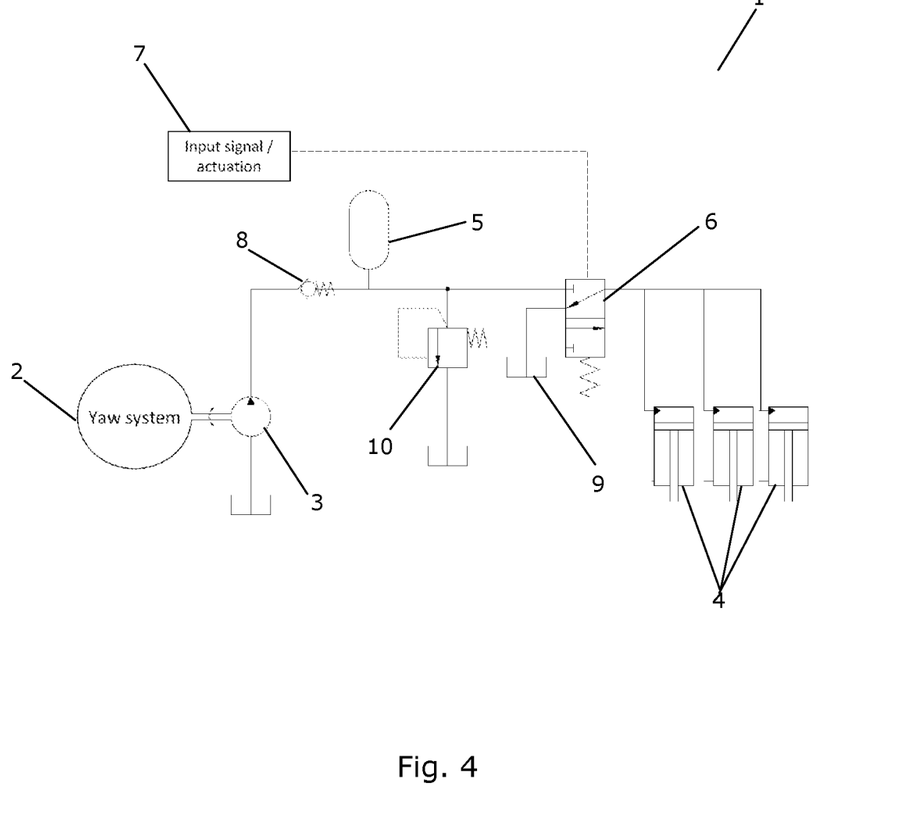
FIG. 4 is a schematic view of the preload mechanism of FIG. 3, during operation of the yawing system.

FIGS. 3 and 4 are schematic views of a preload mechanism 1 for a yawing system 2 according to a second embodiment of the invention. The preload mechanism 1 of FIGS. 3 and 4 is very similar to the preload mechanism 1 of FIGS. 1 and 2, and it will therefore not be described in further detail here. In FIG. 3 the valve 6 is in the first position, corresponding to the situation illustrated in FIG. 1, and in FIG. 4 the valve 6 is in the second position, corresponding to the situation illustrated in FIG. 2.

Whereas the preload mechanism 1 illustrated in FIGS. 1 and 2 comprises only one piston 4, the preload mechanism 1 of FIGS. 3 and 4 comprises three pistons 4. Thus, when the preload mechanism 1 of FIGS. 3 and 4 is operated in the manner described above with reference to FIGS. 1 and 2, all three pistons 4 are moved simultaneously. This has the advantage that a more even pressure can be applied to the surface of the yaw bearing. Furthermore, in the case that one piston 4 fails, without the other pistons 4 failing, e.g. one of the pistons getting stuck, the remaining pistons 4 will ensure that the entire preload mechanism 1 does not fail.

It should be noted that even though one piston 4 is shown in FIGS. 1 and 2, and three pistons 4 are shown in FIGS. 3 and 4, this merely serves illustrative purposes, and it is within the scope of the present invention to include two pistons 4, or to include four or more pistons 4 in the preload mechanism 1.

Figure 5:
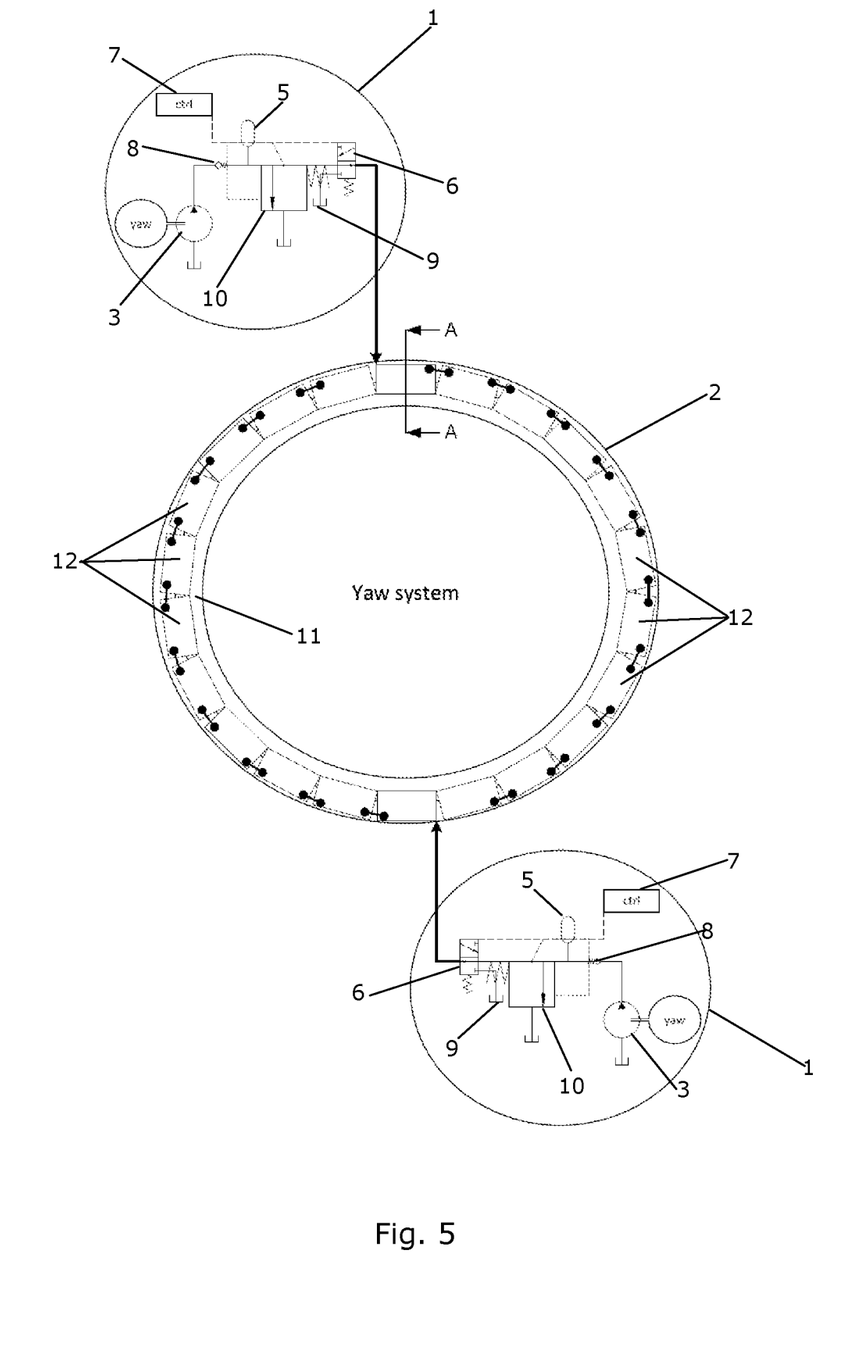
FIG. 5 is a schematic view of a yawing system according to an embodiment of the invention.

FIG. 5 is a schematic view of a yawing system 2 according to an embodiment of the invention. The yawing system 2 of FIG. 5 is provided with two preload mechanisms 1, which each may advantageously be of the kind illustrated in FIGS. 1 and 2, or of the kind illustrated in FIGS. 3 and 4. The operation of the preload mechanisms 1 will therefore not be described in further detail here.

The yawing system 2 comprises a yaw bearing surface 11 and twenty two preload units 12 arranged side-by-side, and adjacent to the yaw bearing surface 11. Each of the preload units 12 comprises one or more pistons (not shown), which can be moved towards or away from the yaw bearing surface 11, as described above with reference to FIGS. 1 and 2.

The preload units 12 are hydraulically interconnected in such a manner that eleven of them are operated by one of the preload mechanisms 1, while the remaining eleven preload units 12 are operated by the other preload mechanism 1. Thereby a modular preload system is provided, comprising two preload modules, each being operated by a separate preload mechanism 1, and each comprising eleven preload units 12. This has the advantage that in the case that one of the preload mechanisms 1 fails, the other preload mechanism 1 will ensure safe operation of the yawing system 2 until the faulty preload mechanism 1 can be repaired or replaced.

In FIG. 5 the preload units 12 of a given preload module are arranged adjacent to each other, i.e. the preload units 12 of one preload module covers a semicircle of the yaw bearing surface 11. It should, however, be noted that the preload units 12 may be interconnected in a different manner to form preload modules. For instance, every second preload unit 12 may be operated by one preload mechanism 1, while the intermediate preload units 12 may be operated by the other preload mechanism 1. In this case the load on the yaw bearing surface 11 will be evenly distributed, even if one of the preload mechanisms 1 fails. As an alternative, the preload units 12 may be interconnected in any other suitable manner.

It should be noted that even though FIG. 5 shows two preload modules, a yawing system 2 comprising only one preload mechanism 1, operating all of the preload units 12 is also within the scope of the present invention. Furthermore, it could be envisaged that the yawing system 2 could comprise three, four, five, or even further preload modules, each being operated by a separate preload mechanism 1, thereby increasing the redundancy as compared to the embodiment shown in FIG. 5. As described above, the preload units 12 may be interconnected in any suitable manner to form the preload modules.

Figure 6:
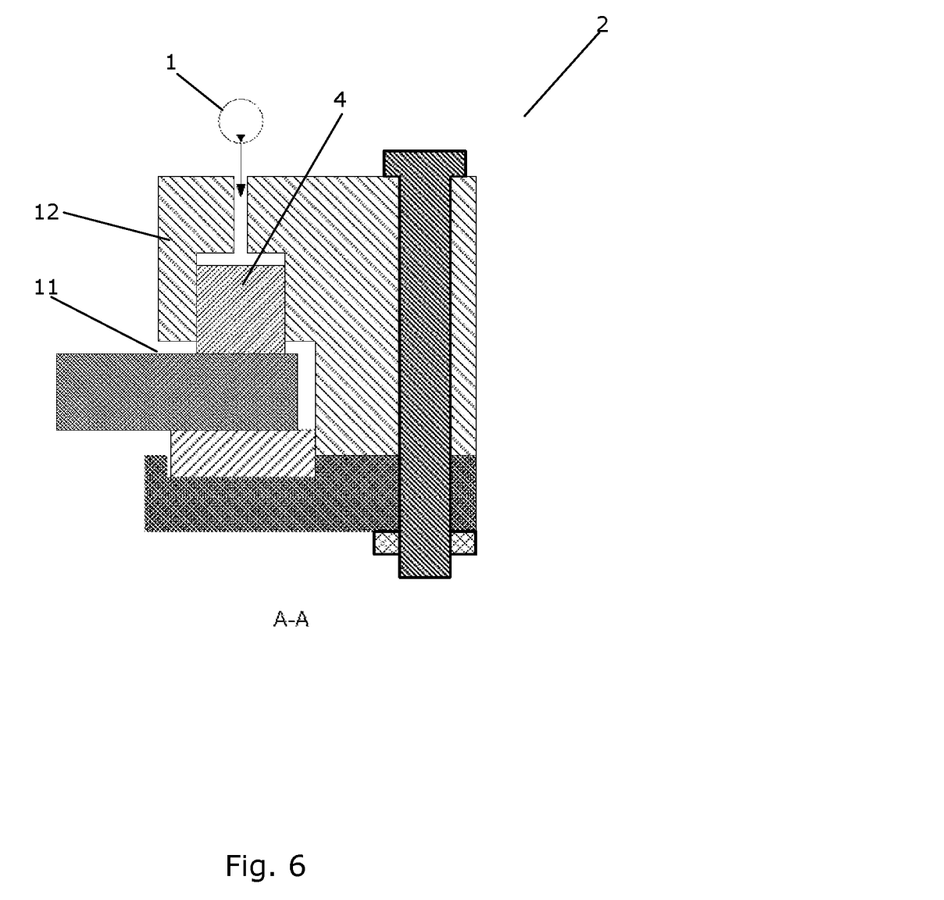
FIG. 6 is a cross sectional view of the yawing system of FIG. 5.

FIG. 6 is a cross sectional view of the yawing system 2 of FIG. 5, along the line A-A. Accordingly, the cross sectional view passes through a preload unit 12.

In FIG. 6 it is shown that a piston 4 is arranged inside the preload unit 12. The piston 4, which is operated by means of a preload mechanism 1 as described above with reference to FIGS. 1 and 2, is movable towards and away from the yaw bearing surface 11. In FIG. 6 the piston 4 is arranged in abutment with the yaw bearing surface 11, i.e. friction between the piston 4 and the yaw bearing surface 11 inhibits mutual movement between the preload unit 12 and the yaw bearing surface 11.

In the case that it is desired to perform yawing movements, the preload mechanism 1 is operated, as described above with reference to FIGS. 1 and 2, thereby moving the piston 4 in a direction away from the yaw bearing surface 11. When the piston 4 is no longer arranged in abutment with the yaw bearing surface 11, mutual movement between the preload unit 12 and the yaw bearing surface 11 can easily be performed, and thereby it is possible to perform yawing movements without having to overcome a friction force between the piston 4 and the yaw bearing surface 11.

The invention claimed is:

1. A method of operating a yawing system for a wind turbine, the yawing system including a hydraulically driven preload mechanism having a hydraulically operated piston, an accumulator, and a valve switchable between a first position establishing a fluid connection between the hydraulically operated piston and the accumulator and a second position establishing a fluid connection between the hydraulically operated piston and a tank, the method comprising the steps of:

applying a preload force to a yaw bearing of the yawing system when the yawing system is not performing yawing movements, wherein the valve is in the first position so that pressure in the accumulator causes the hydraulically operated piston to apply the preload force, moving the valve to the second position, thereby allowing fluid to flow from the hydraulically operated piston to the tank, via the established fluid connection, to release the preload force provided by the hydraulically operated piston, and operating the yawing system to perform yawing movements, wherein said operation of the yawing system automatically causes a pump to operate to supply fluid to the accumulator.

2. The method according to claim 1, further comprising: stopping operation of the yawing system, and moving the valve to the first position, thereby allowing fluid to flow from the accumulator to the hydraulically operated piston, via the established fluid connection, so that pressure in the accumulator causes the hydraulically operated piston to apply a preload force.

3. The method according to claim 1, wherein the step of operating the yawing system comprises driving the pump by means of a ring gear of the yawing system.

4. The method according to claim 1, wherein the step of moving the valve is controlled by means of a control unit.

5. The method according to claim 4, wherein the control unit controls movements of the valve between the first position and the second position in response to an electronic, mechanical, or hydraulic signal.

6. The method according to claim 1, wherein the step of moving the valve to the second position and the step of operating the yawing system are initiated simultaneously.

7. A yawing system for a wind turbine, the yawing system comprising:

at least one yaw drive arranged to cause the yawing system to perform yawing movements, a yaw bearing allowing mutual movement between two parts of the yawing system during yawing movements, a hydraulically driven preload mechanism having at least one pump configured to be automatically operated as a consequence of operating the yawing system, at least one hydraulically operated piston being arranged to provide a preload force to the yaw bearing, at least one accumulator, and a valve being switchable between a first position establishing a fluid connection between the hydraulically operated piston and the accumulator and a second position establishing a fluid connection between the hydraulically operated piston and a tank, and a control unit configured to switch the valve from the first position to the second position when the yawing system performs yawing movements, wherein a pressure is automatically built up in the accumulator as a consequence of operating the yawing system.

8. The yawing system according to claim 7, wherein the control unit is configured to control movements of the valve between the first position and the second position in response to an electronic, mechanical or hydraulic signal.

9. The yawing system according to claim 7, wherein the preload force provided by the hydraulically operated piston increases when the valve is in the first position, and decreases when the valve is in the second position.

10. The yawing system according to claim 7, wherein the yaw bearing is a friction bearing.

11. The yawing system according to claim 10, wherein at least a portion of the preload mechanism constitutes at least a portion of the friction bearing.

12. The yawing system according to claim 7, wherein the preload mechanism is arranged to provide friction between two surfaces.

13. The yawing system according to claim 7, said yawing system comprising at least two preload mechanisms, each preload mechanism being adapted to provide an adjustable preload force to the yaw bearing, and each preload mechanism being automatically operated as a consequence of operating the yawing system.

14. The yawing system according to claim 13, wherein the preload mechanisms are operated independently of each other.

15. The yawing system according to claim 7, wherein the valve is biased toward the first position.

16. A yawing system for a wind turbine, the yawing system comprising:

at least one yaw drive arranged to cause the yawing system to perform yawing movements, a yaw bearing allowing mutual movement between two parts of the yawing system during yawing movements, a hydraulically driven preload mechanism having at least one pump configured to be automatically operated as a consequence of operating the yawing system, at least one hydraulically operated piston being arranged to provide a preload force to the yaw bearing, at least one accumulator, and a valve being switchable between a first position establishing a fluid connection between the hydraulically operated piston and the accumulator and a second position establishing a fluid connection between the hydraulically operated piston and a tank, and a control unit configured to switch the valve from the first position to the second position when the yawing system performs yawing movements, wherein the pump is driven by a ring gear of the yawing system.

17. The yawing system according to claim 16, wherein the control unit is configured to control movements of the valve between the first position and the second position in response to an electronic, mechanical or hydraulic signal.

18. The yawing system according to claim 16, wherein the preload force provided by the hydraulically operated piston increases when the valve is in the first position, and decreases when the valve is in the second position.

19. The yawing system according to claim 16, wherein the yaw bearing is a friction bearing.

20. The yawing system according to claim 16, wherein the valve is biased toward the first position.

* * * * *